United States Patent
Hamakubo et al.

(10) Patent No.: US 10,294,052 B2
(45) Date of Patent: May 21, 2019

(54) SHEET FEED ROLLER, AND METHOD OF PRODUCING THE SAME

(71) Applicant: SUMITOMO RUBBER INDUSTRIES, LTD., Kobe-shi, Hyogo (JP)

(72) Inventors: Masashi Hamakubo, Kobe (JP); Yudai Okuno, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 179 days.

(21) Appl. No.: 15/368,088

(22) Filed: Dec. 2, 2016

(65) Prior Publication Data

US 2017/0174456 A1 Jun. 22, 2017

(30) Foreign Application Priority Data

Dec. 18, 2015 (JP) .................. 2015-247780

(51) Int. Cl.
*B65H 5/06* (2006.01)
*B65H 9/16* (2006.01)
*H04N 1/00* (2006.01)
*B65H 27/00* (2006.01)
*G03G 15/00* (2006.01)

(52) U.S. Cl.
CPC ............ *B65H 5/062* (2013.01); *B65H 9/166* (2013.01); *B65H 27/00* (2013.01); *G03G 15/65* (2013.01); *G03G 15/6529* (2013.01); *H04N 1/00602* (2013.01); *B65H 2401/111* (2013.01); *B65H 2401/114* (2013.01); *B65H 2401/115* (2013.01); *B65H 2401/231* (2013.01); *B65H 2402/80* (2013.01); *B65H 2404/10* (2013.01); *B65H 2404/531* (2013.01); *B65H 2404/532* (2013.01); *G03G 2215/00683* (2013.01); *H04N 2201/0094* (2013.01)

(58) Field of Classification Search
CPC .......... G03G 15/6555; G03G 15/6558; G03G 15/657; G03G 15/6573; G03G 15/6552; G03G 15/652
See application file for complete search history.

(56) References Cited

U.S. PATENT DOCUMENTS

| 4,976,880 A | * | 12/1990 | Satoji | ...................... C08L 21/00 508/204 |
|---|---|---|---|---|
| 4,978,463 A | * | 12/1990 | Satoji | ...................... C08L 21/00 508/204 |
| 6,139,006 A | * | 10/2000 | Asada | .................. B65H 3/0638 271/109 |

(Continued)

FOREIGN PATENT DOCUMENTS

| JP | 2008-254845 A | 10/2008 |
| JP | 2013-35613 A | 2/2013 |

*Primary Examiner* — Jason L Vaughan
(74) *Attorney, Agent, or Firm* — Birch, Stewart, Kolasch & Birch LLP

(57) ABSTRACT

A sheet feed roller (1) is provided, which is formed of an elastomer composition containing a thermoplastic elastomer, a spherical filler and a low friction silicone compound, and has a friction coefficient of not greater than 0.5. A production method is also provided, which includes the step of extruding the elastomer composition through a die configured as corresponding to a sectional shape of the sheet feed roller.

6 Claims, 1 Drawing Sheet

(56) References Cited

U.S. PATENT DOCUMENTS

| | | | | |
|---|---|---|---|---|
| 6,273,415 B1* | 8/2001 | Tengo | ................... | B65H 27/00 |
| | | | | 271/109 |
| 6,481,707 B2* | 11/2002 | Matsuo | ................... | B41J 13/03 |
| | | | | 271/109 |
| 6,793,611 B2* | 9/2004 | Hattori | ................... | C08L 53/02 |
| | | | | 428/492 |
| 7,172,543 B2* | 2/2007 | Uesaka | .............. | G03G 15/0233 |
| | | | | 492/53 |
| 7,253,233 B2* | 8/2007 | Sugimoto | ............... | C08L 21/00 |
| | | | | 525/89 |
| 7,367,554 B2* | 5/2008 | Mine | ................... | B65H 3/5223 |
| | | | | 271/104 |
| 7,448,610 B2* | 11/2008 | Ito | ....................... | B65H 3/0638 |
| | | | | 271/109 |
| 8,900,108 B2* | 12/2014 | Mine | ..................... | B65H 27/00 |
| | | | | 492/53 |
| 8,986,182 B2* | 3/2015 | Tamura | .................. | F16C 13/00 |
| | | | | 492/48 |
| 9,422,124 B2* | 8/2016 | Tamura | ................ | B65H 3/0638 |
| 9,586,774 B2* | 3/2017 | Mine | ....................... | B65H 3/52 |
| 9,637,623 B2* | 5/2017 | Mine | ....................... | C08L 19/00 |
| 9,809,405 B2* | 11/2017 | Hamakubo | ............ | C08L 23/16 |
| 9,885,970 B2* | 2/2018 | Tajima | ............... | G03G 15/0233 |
| 2005/0038186 A1* | 2/2005 | Morikawa | ............... | C08L 23/02 |
| | | | | 525/98 |
| 2015/0050052 A1* | 2/2015 | Hoshio | ............... | G03G 15/0216 |
| | | | | 399/176 |

* cited by examiner

SHEET FEED ROLLER, AND METHOD OF PRODUCING THE SAME

TECHNICAL FIELD

The present invention relates to a sheet feed roller to be advantageously used as a pinch roller, for example, in an image forming apparatus, and a method of producing the sheet feed roller.

BACKGROUND ART

In an image forming apparatus such as a laser beam printer, an electrostatic copying machine, a plain paper facsimile machine or a printer-copier-facsimile multifunction machine, a pinch roller and a counter roller such as of a rubber are adapted to hold a paper sheet therebetween for transportation of the paper sheet. In general, the pinch roller is made of a resin which has a lower friction coefficient than the rubber.

Particularly, where the pinch roller is not disposed parallel to the counter roller but disposed at a small angle with respect to the counter roller in order to bias the held paper sheet toward one lateral side, the pinch roller is required to slip on the paper sheet after having fully biased the paper sheet to the one lateral side. Therefore, the pinch roller is required to have a lower friction coefficient However, the pinch roller of the resin harder than the rubber is liable to damage the softer counter roller of the rubber when being brought into direct contact with the counter roller, for example, during an interval of a sheet feeding operation.

Patent Document 1 discloses that a sheet feed roller (pinch roller) unified with a shaft which rotatably supports the sheet feed roller is produced by injection-molding an elastomer composition prepared by blending resin beads with a thermoplastic urethane elastomer.

With this arrangement, the sheet feed roller is formed of the thermoplastic urethane elastomer, which is softer than the resin and has a lower friction coefficient than the rubber, whereby the sheet feed roller is moderately soft. Further, the resin beads, which function to reduce the friction coefficient, are blended with the thermoplastic urethane elastomer, whereby the friction coefficient of the sheet feed roller is reduced to some extent.

CITATION LIST

Patent Document

[PATENT DOCUMENT 1] JP2013-35613A

SUMMARY OF THE INVENTION

Problem to be Solved by the Invention

However, the aforementioned effects have limitations. With the arrangement disclosed in Patent Document 1, as apparent from the results for Examples and Comparative Examples in the disclosure, the friction coefficient of the sheet feed roller is reduced as the proportion of the resin beads is increased. However, the reduction in friction coefficient is insufficient for the proportion of the resin beads.

Particularly, in order to reduce the friction coefficient of the sheet feed roller to less than 0.5 to use the sheet feed roller as the pinch roller for the biasing, it is necessary to blend the resin beads in a greater amount falling outside a range covered by Examples described in Patent Document 1 (a range specified in the paragraph [0030] of Patent Document 1).

Therefore, the sheet feed roller is as hard as the sheet feed roller of the resin and, therefore, is problematically liable to damage the rubber counter roller when being brought into direct contact with the rubber counter roller.

The inventor of the present invention considers that this problem occurs because the sheet feed roller is produced by the injection molding of the elastomer composition.

Where the sheet feed roller is produced by the injection molding, the outer peripheral surface of the sheet feed roller to be brought into contact with a paper sheet has a smooth surface geometry defined by a mold surface of a mold to be imparted with a higher friction coefficient. Further, most of the resin beads are buried in the outer peripheral surface, failing to contribute to the reduction in friction coefficient. Therefore, the reduction in friction coefficient tends to be insufficient for the proportion of the resin beads as described above.

In addition, the injection molding requires an expensive injection molding mold, and is less productive with the need for a batch process. This problematically increases the production costs of the sheet feed roller.

It is an object of the present invention to provide a sheet feed roller which comprises a thermoplastic elastomer and a spherical filler such as resin beads or glass beads and has a proper flexibility and a lower friction coefficient, and to provide a method of producing the sheet feed roller.

Solution to Problem

According to an inventive aspect, there is provided a sheet feed roller which is formed of an elastomer composition containing a thermoplastic elastomer, a spherical filler and a low friction silicone compound, and has a friction coefficient of not greater than 0.5.

According to another inventive aspect, there is provided a method of producing a sheet feed roller, the method including the step of extruding an elastomer composition through a die configured as corresponding to a sectional shape of the sheet feed roller.

Effects of the Invention

According to the present invention, the sheet feed roller comprises the thermoplastic elastomer and the spherical filler, and yet has a higher flexibility and a lower friction coefficient than the conventional sheet feed roller. The production method for the sheet feed roller is also provided.

EMBODIMENTS OF THE INVENTION

Figure 1:
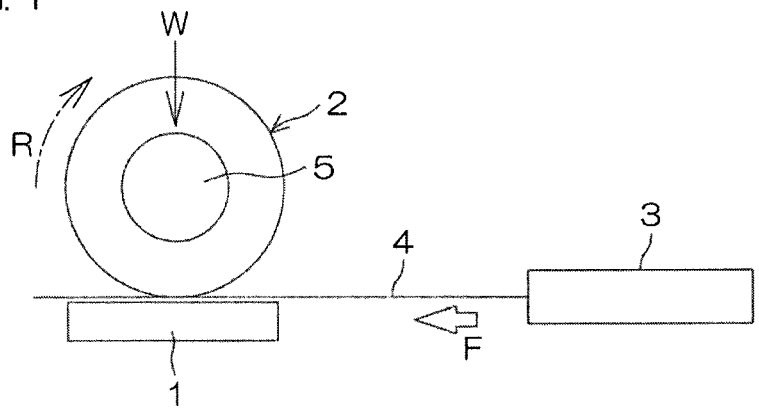
FIG. 1 is a diagram for explaining how to measure the friction coefficient of a sheet feed roller according to the present invention.

A sheet feed roller according to the present invention is formed of an elastomer composition containing a thermoplastic elastomer, a spherical filler and a low friction silicone compound, and has a friction coefficient of not greater than 0.5.

According to the present invention, the low friction silicone compound, which is effective to reduce the friction of the elastomer composition, is blended with the thermoplastic elastomer and the spherical filler, whereby the friction coefficient of the sheet feed roller formed of the elastomer composition can be further reduced.

This makes it possible to reduce the friction coefficient of the sheet feed roller, while imparting the sheet feed roller with a proper flexibility by controlling the proportion of the spherical filler.

That is, where the friction coefficient is controlled at not greater than 0.5, preferably not greater than 0.42, the sheet feed roller can be used, for example, as a pinch roller. The pinch roller is adapted to smoothly slip on a paper sheet after having fully biased the paper sheet to one lateral side, whereby the paper sheet is substantially prevented from being wrinkled.

Where the sheet feed roller is imparted with a proper flexibility for use as the pinch roller, the pinch roller is substantially prevented from damaging a counter roller of a rubber brought into direct contact with the pinch roller.

For further improvement of this effect, the sheet feed roller preferably has a type-A durometer hardness of not greater than 95, particularly preferably not greater than 90.

A method of producing the sheet feed roller according to the present invention includes the step of extruding the elastomer composition through a die configured as corresponding to the sectional shape of the sheet feed roller.

According to the present invention, the elastomer composition extruding step allows the sheet feed roller to have a rougher outer peripheral surface with a lower friction coefficient as compared with a case in which the sheet feed roller is produced as having a smooth outer peripheral surface by the injection molding.

That is, most particles of the spherical filler present in the outer peripheral surface project from the outer peripheral surface to a certain extent which depends on a resin pressure to be applied during the extrusion and the affinity of the spherical filler for the thermoplastic elastomer and the like, thereby reducing the friction coefficient of the sheet feed roller.

This reduces the friction coefficient to a greater extent which corresponds to the proportion of the spherical filler. Further, the low friction silicone compound and the spherical filler synergistically provide the friction reducing effect. Thus, the friction coefficient of the sheet feed roller can be efficiently reduced to further improve the effect of the present invention.

The present invention obviates the need for the expensive mold, and permits a continuous extrusion process, making it possible to produce the sheet feed roller at lower costs.

In order to allow the pinch roller to properly function to bias the paper sheet to the one lateral side, for example, the sheet feed roller preferably has a certain frictional force. The friction coefficient of the sheet feed roller is preferably not less than 0.2 within the aforementioned range.

Where a plasticizer or the like is added to the thermoplastic elastomer, it is possible to make the sheet feed roller softer than the original thermoplastic elastomer.

In the present invention, the friction coefficient and the type-A durometer hardness of the sheet feed roller are each measured in the following manner.

<Friction Coefficient>

As shown in FIG. 1, a polytetrafluoroethylene (PTFE) plate 1 is placed horizontally. One end of a paper sheet 4 (P-sheet (plain paper sheet) available from Fuji Xerox Co., Ltd.) having a size of 60 mm×210 mm is connected to a load cell 3, and the other end portion of the paper sheet 4 is held between the plate 1 and a sheet feed roller 2 (having an outer peripheral surface width of 10 mm) to be subjected to measurement of the friction coefficient thereof. In this state, a vertical load W of 0.98 N (=100 gf) is applied to a shaft 5 of the sheet feed roller 2 as indicated by a solid line arrow in FIG. 1.

In this state, the sheet feed roller 2 is rotated in a direction indicated by a one-dot-and-dash line arrow R at a circumferential speed of 30 mm/second at a temperature of 23±2° C. at a relative humidity of 55±10%, and a transport force F (gf) exerted on the load cell 3 is measured.

Then, the friction coefficient is determined from the following expression (1) based on the measured transport force F and the vertical load W (=100 gf).

$$\text{Friction coefficient} = F(gf)/W(gf) \tag{1}$$

<Type-A Durometer Hardness>

The elastomer composition for the sheet feed roller is formed into a 2-mm thick sheet, and three such sheets are stacked to provide a test strip.

The type-A durometer hardness of the test strip is measured by a measurement method specified in Japanese Industrial Standards JIS K6253-3$_{:2012}$ "Rubber, vulcanized or thermoplastic—Determination of hardness—Part 3: Durometer method" after a lapse of 15 seconds.

<Thermoplastic Elastomer>

Various thermoplastic elastomers that are softer than the resin and lower in friction coefficient than the rubber as described above are usable as the thermoplastic elastomer. Examples of the thermoplastic elastomers include a thermoplastic polyester elastomer, a thermoplastic urethane elastomer, a thermoplastic styrene elastomer and a thermoplastic olefin elastomer.

A roller such as of an ethylene propylene diene rubber (EPDM) is often used as a counter roller in combination with the pinch roller. The EPDM roller generally contains a plasticizer such as a paraffin oil.

If the plasticizer migrates from the counter roller to the pinch roller, however, the pinch roller is liable to become excessively soft to be easily worn.

Therefore, the sheet feed roller to be used as the pinch roller in combination with the EPDM counter roller is preferably formed of the thermoplastic urethane elastomer and/or the thermoplastic polyester elastomer to which the plasticizer is less liable to migrate.

Examples of the thermoplastic urethane elastomer include extrudable thermoplastic urethane elastomers of ELASTOLLAN (registered trade name) series available from BASF Japan Ltd., which may be used alone or in combination.

Examples of the thermoplastic polyester elastomer include extrudable thermoplastic polyester elastomers of HYTREL (registered trade name) series available from Du Pont-Toray Co., Ltd., which may be used alone or in combination.

Particularly, the thermoplastic urethane elastomer is preferred for imparting the sheet feed roller with a proper wear resistance, and the thermoplastic polyester elastomer is preferred for imparting the sheet feed roller with a proper flexibility.

Therefore, an optimum thermoplastic elastomer may be selected depending on the use purpose of the sheet feed roller and the properties of the sheet feed roller required for the use purpose.

<Spherical Filler>

The spherical filler to be used in the present invention is not necessarily required to be exactly spherical, but may be in a bead form or in a granular form.

Various organic and inorganic spherical fillers capable of reducing the friction coefficient of the sheet feed roller and free from fusion and deformation due to heat applied during the extrusion are usable as the spherical filler. Examples of the spherical filler include resin beads such as of a crosslinked acryl resin and other hard resins, glass beads, spherical silica and spherical alumina, which may be used alone or in combination.

The spherical filler may be surface-treated with a coupling agent or the like for improvement of the affinity for the thermoplastic elastomer.

In consideration of not only the hardness and the strength of the spherical filler but also the affinity for the thermoplastic elastomer, the handleability and the availability of the spherical filler and the like, the glass beads and/or the crosslinked acryl resin beads are preferred.

In order to further improve the friction coefficient reducing effect by causing the spherical filler particles to project on the outer peripheral surface of the sheet feed roller, as described above, the spherical filler preferably has an average particle diameter of not less than 1 µm, more preferably not less than 5 µm, particularly preferably not less than 15 µm.

If the spherical filler has an excessively great average particle diameter, however, the spherical filler particles are liable to be detached from the outer peripheral surface of the sheet feed roller. Therefore, the spherical filler preferably has an average particle diameter of not greater than 120 µm, particularly preferably not greater than 100 µm, within the aforementioned range.

Beads of various types of glasses such as soda lime glass and low alkali glass are usable as the glass beads. Examples of the glass beads include general purpose glass beads GB301S (soda lime glass beads having an average particle diameter of 50 µm), EGB731 (low alkali glass beads having an average particle diameter of 20 µm) and EGB731C (low alkali glass beads having an average particle diameter of 20 µm and surface-treated with acryl silane) available from Potters-Ballotini Co., Ltd., which may be used alone or in combination.

Examples of the crosslinked acryl resin beads include METABRENE (registered trade name) F-410 (having an average particle diameter of 100 µm) available from Mitsubishi Rayon Co., Ltd., and GANZ PEARL (registered trade name) GBX-10S (having an average particle diameter of 8 to 12 µm) available from Aica Kogyo Co., Ltd., at least one of which may be used.

The proportion of the spherical filler to be blended may be properly determined depending on the type and the average particle diameter of the spherical filler, the type, the grade and the hardness of the thermoplastic elastomer to be used in combination with the spherical filler, and the hardness, the friction coefficient and the like of the sheet feed roller of interest.

Where the thermoplastic urethane elastomer has a type-A durometer hardness of 85 without the blending of the spherical filler and a sheet feed roller having a type-A durometer hardness of not greater than 95 and a friction coefficient of not greater than 0.5 is produced by blending the spherical filler with the thermoplastic urethane elastomer, for example, the proportion of the glass beads to be blended as the spherical filler is preferably not less than 15 parts by mass and not greater than 80 parts by mass, more preferably not less than 20 parts by mass, particularly preferably not less than 40 parts by mass, based on 100 parts by mass of the thermoplastic urethane elastomer.

For the same conditions, the proportion of the crosslinked acryl resin beads to be blended as the spherical filler is preferably not less than 10 parts by mass and not greater than 30 parts by mass, particularly preferably not less than 15 parts by mass, based on 100 parts by mass of the thermoplastic urethane elastomer.

Where the thermoplastic polyester elastomer has a type-A durometer hardness of 77 without the blending of the spherical filler and a sheet feed roller having a type-A durometer hardness of not greater than 95 and a friction coefficient of not greater than 0.5 is produced by blending the spherical filler with the thermoplastic polyester elastomer, the proportion of the glass beads to be blended as the spherical filler is preferably not less than 15 parts by mass and not greater than 80 parts by mass, more preferably not less than 20 parts by mass, particularly preferably not less than 40 parts by mass, based on 100 parts by mass of the thermoplastic polyester elastomer.

For the same conditions, the proportion of the crosslinked acryl resin beads to be blended as the spherical filler is preferably not less than 10 parts by mass and not greater than 30 parts by mass, particularly preferably not less than 15 parts by mass, based on 100 parts by mass of the thermoplastic polyester elastomer.

<Low Friction Silicone Compound>

Various silicone compounds capable of reducing the friction coefficient of the sheet feed roller when being used in combination with the thermoplastic elastomer and the spherical filler are usable as the low friction silicone compound.

Examples of the low friction silicone compound include a silicone/acryl composite resin material, an ultra-high molecular weight silicone polymer and silicone resin powder.

Examples of the silicone/acryl composite resin material include Mitsubishi Rayon's METABLEN (registered trade name) S series products which are core-shell type materials including cores of a composite rubber of organopolysiloxane and acryl and shells formed around the cores by graft polymerization of a vinyl monomer such as acryl.

Other examples of the silicone/acryl composite resin material include Nissin Chemical's CHALINE (registered trade name) R series products which are produced by granulating a silicone acryl copolymer into a spherical or irregular powdery form.

On the other hand, a master batch containing the ultra-high molecular weight silicone polymer and a given base resin is used as the ultra-high molecular weight silicone polymer for improvement of the handleability.

Examples of the master batch include a blend type master batch prepared by blending the ultra-high molecular weight silicone polymer with the given base resin, and a graft type master batch prepared by graft-polymerizing a reactive organopolysiloxane with a base polymer (SILICONE CONCENTRATE BY27 series products available from Dow Corning-Toray Co., Ltd.)

Examples of the silicone resin powder include KMP-590 available from Shin-Etsu Chemical Co., Ltd., and TOSPEARL series products available from Momentive Performance Materials Japan Inc.

These low friction silicone compounds may be used alone or in combination.

The proportion of the low friction silicone compound to be blended may be properly determined depending on the type of the low friction silicone compound, the type and the grade of the thermoplastic elastomer to be used in combination with the low friction silicone compound, the type and the proportion of the spherical filler, and the friction coefficient and the like of the sheet feed roller of interest.

Where the sheet feed roller is imparted with a friction coefficient of not greater than 0.5 by using the thermoplastic urethane elastomer and the spherical filler in combination, for example, the proportion of the silicone/acryl composite resin material to be blended is preferably not less than 10 parts by mass and not greater than 25 parts by mass, particularly preferably not less than 15 parts by mass and not greater than 20 parts by mass, based on 100 parts by mass of the thermoplastic urethane elastomer.

For the same conditions, the effective proportion of the ultra-high molecular weight silicone polymer contained in the master batch is preferably not less than 1 part by mass and not greater than 5 parts by mass based on 100 parts by mass of the thermoplastic urethane elastomer.

Where the sheet feed roller is imparted with a friction coefficient of not greater than 0.5 by using the thermoplastic polyester elastomer and the spherical filler in combination, the proportion of the silicone/acryl composite resin material to be blended is preferably not less than 10 parts by mass and not greater than 25 parts by mass, particularly preferably not less than 15 parts by mass and not greater than 20 parts by mass, based on 100 parts by mass of the thermoplastic polyester elastomer.

For the same conditions, the effective proportion of the ultra-high molecular weight silicone polymer contained in the master batch is preferably not less than 1 part by mass and not greater than 5 parts by mass based on 100 parts by mass of the thermoplastic polyester elastomer.

<Other Ingredients>

As required, the elastomer composition may further contain various additives in given proportions.

Examples of the additives include an organic or inorganic filler, a colorant such as a pigment, a processing aid such as a plasticizer, an electrical conductivity imparting agent and a stabilizer.

<Production Method>

The inventive sheet feed roller can be produced by an inventive production method, which includes the step of extruding the elastomer composition containing the aforementioned ingredients through a die configured as corresponding to the sectional shape of the sheet feed roller.

More specifically, the thermoplastic elastomer, the spherical filler, the low friction silicone compound and the other ingredients are dry-blended in the predetermined proportions, then kneaded together, and pelletized. The resulting pellets are fed into a cylinder of an extruder, further kneaded, and extruded through the die. The resulting product is cooled, and cut to a predetermined length corresponding to the width of the outer peripheral surface. Thus, the inventive sheet feed roller is produced.

<Shaft>

A shaft is inserted through a center through-hole of the sheet feed roller thus produced to support the sheet feed roller rotatably about the shaft.

The shaft may be fixed to the sheet feed roller for unitary rotation, or the sheet feed roller may be freely rotatable about the shaft.

Where the shaft is fixed to the sheet feed roller for the unitary rotation, the shaft may be bonded to the sheet feed roller with an adhesive agent, or a shaft having an outer diameter greater than the inner diameter of the through-hole may be press-inserted into the through-hole.

EXAMPLES

Example 1

A silicone/acryl composite resin material of a core-shell type including cores of a composite rubber of organopolysiloxane and acryl and shells formed around the cores by graft polymerization of acryl (METABLEN SX-005 available from Mitsubishi Rayon Co., Ltd.) was used as a low friction silicone compound.

Then, 100 parts by mass of a thermoplastic urethane elastomer (ELASTOLLAN ET385 available from BASF Japan Ltd. and having a type-A durometer hardness of 85), 80 parts by mass of glass beads (low alkali glass beads EGB731C available from Potters-Ballotini Co., Ltd., having an average particle diameter of 20 μm and surface-treated with acryl silane) and 10 parts by mass of the silicone/acryl composite resin material were dry-blended, and the resulting mixture was extruded into strands each having a diameter of about 2 mm by means of a twin screw extruder. The strands were cut to lengths of 2 to 4 mm. Thus, pellets of an elastomer composition were produced.

Subsequently, the pellets thus produced were fed into a single screw extruder, and extruded into a tubular body having an inner diameter of 5 mm and an outer diameter of 7 mm through a die connected to a head of the extruder. Then, the resulting tubular body was cut to a length of 10 mm. Thus, a sheet feed roller was produced as a pinch roller having an outer peripheral surface which had a width of 10 mm as corresponding to the aforementioned length.

Further, a shaft having an outer diameter of 5 mm was press-inserted into a center through-hole of the sheet feed roller thus produced, and fixed to the through-hole for unitary rotation.

Example 2

A sheet feed roller was produced in substantially the same manner as in Example 1, except that the proportion of the glass beads was 50 parts by mass and the proportion of the silicone/acryl composite resin material of the core-shell type was 15 parts by mass based on 100 parts by mass of the thermoplastic urethane elastomer.

Example 3

A silicone/acryl composite resin material prepared by granulating a silicone acryl copolymer into a spherical powdery form (CHALINE R-170S available from Nissin Chemical Co., Ltd., and having a silicone content of 70% and an average particle diameter of 30 μm) was used as the low friction silicone compound.

Then, a sheet feed roller was produced in substantially the same manner as in Example 1, except that the proportion of the glass beads was 40 parts by mass and the proportion of the silicone/acryl composite resin material of the spherical powdery form was 20 parts by mass based on 100 parts by mass of the thermoplastic urethane elastomer.

Example 4

A blend type master batch prepared by blending an ultra-high molecular weight silicone polymer with a polypropylene (SILICONE CONCENTRATE BY27-001 available from Dow Corning-Toray Co., Ltd., and having an ultra-high molecular weight silicone polymer content of 50%) was used as the low friction silicone compound.

Then, a sheet feed roller was produced in substantially the same manner as in Example 1, except that the proportion of the glass beads was 20 parts by mass and the proportion of the master batch was 5 parts by mass based on 100 parts by mass of the thermoplastic urethane elastomer.

The effective proportion of the ultra-high molecular weight silicone polymer was 2.5 parts by mass based on 100 parts by mass of the thermoplastic urethane elastomer.

Example 5

A thermoplastic polyester elastomer (HYTREL 3046 available from Du Pont-Toray Co., Ltd., and having a type-A durometer hardness of 77) was used as a thermoplastic elastomer.

Then, a sheet feed roller was produced in substantially the same manner as in Example 1, except that the proportion of the glass beads was 50 parts by mass and the proportion of the silicone/acryl composite resin material of the core-shell type was 15 parts by mass based on 100 parts by mass of the thermoplastic polyester elastomer.

Comparative Example 1

A sheet feed roller was produced in substantially the same manner as in Example 1, except that the proportion of the glass beads was 10 parts by mass and the proportion of the silicone/acryl composite resin material of the core-shell type was 20 parts by mass based on 100 parts by mass of the thermoplastic urethane elastomer.

Comparative Example 2

A sheet feed roller was produced in substantially the same manner as in Example 1, except that the proportion of the glass beads was 50 parts by mass based on 100 parts by mass of the thermoplastic urethane elastomer and the low friction silicone compound was not blended.

The Friction coefficient of each of the sheet feed rollers produced in Examples and Comparative Examples was measured by the aforementioned measurement method.

Further, a wear test was performed in which the sheet feed roller 2 was rotated for a total of 15 minutes in substantially the same manner as in the friction coefficient measuring method described with reference to FIG. 1 except that the vertical load W was 2.94 N (=300 gf) and the circumferential speed was 200 mm/second, while a paper sheet was changed to a new one every 5 minutes. The sheet feed roller was evaluated for wear resistance by determining a mass change percentage (%) from the following expression (2) based on the mass $w_0$ of the sheet feed roller 2 measured before the wear test and the mass $w_1$ of the sheet feed roller 2 after the wear test:

$$\text{Mass change percentage (\%)} = [(W_1 - W_0)/W_0] \times 100 \quad (2)$$

The pellets produced in Examples and Comparative Examples were extruded into a sheet having a thickness of 2 mm and a width of about 40 mm, and three such sheets were stacked to prepare a test strip for measurement of the type-A durometer hardness. The type-A durometer hardness of the test strip thus prepared was measured by the aforementioned measurement method.

A dumbbell-shaped No. 3 test strip specified in Japanese Industrial Standards JIS K6251$_{:2010}$ "Rubber, vulcanized or thermoplastic—Determination of tensile stress-strain properties" was prepared by stamping the 2-mm thick sheet. The breaking elongation $E_b$ (%) of the dumbbell-shaped No. 3 test strip was measured at a temperature of 23±2° C. when a tensile test was performed in conformity with a test method specified in JIS K6251$_{:2010}$.

The above results are shown in Tables 1 and 2.

TABLE 1

|  | Example 1 | Example 2 | Example 3 | Example 4 |
|---|---|---|---|---|
| Parts by mass | | | | |
| Thermoplastic urethane elastomer | 100 | 100 | 100 | 100 |
| Thermoplastic polyester elastomer | — | — | — | — |
| Glass beads | 80 | 50 | 40 | 20 |
| Silicone/acryl composite resin material | | | | |
| Core-shell type | 10 | 15 | — | — |
| Spherical type | — | — | 20 | — |
| Ultra-high molecular weight silicone polymer (effective proportion) | — | — | — | 2.5 |
| Test results | | | | |
| Friction coefficient | 0.24 | 0.26 | 0.28 | 0.42 |
| Mass change percentage (%) | −0.05 | −0.03 | −0.02 | −0.08 |
| Type-A hardness | 87 | 86 | 85 | 86 |
| Breaking elongation $E_b$ (%) | 520 | 630 | 610 | 600 |

TABLE 2

|  | Example 5 | Comparative Example 1 | Comparative Example 2 |
|---|---|---|---|
| Parts by mass | | | |
| Thermoplastic urethane elastomer | — | 100 | 100 |
| Thermoplastic polyester elastomer | 100 | — | — |
| Glass beads | 50 | 10 | 50 |
| Silicone/acryl composite resin material | | | |
| Core-shell type | 15 | 20 | — |
| Spherical type | — | — | — |
| Ultra-high molecular weight silicone polymer (effective proportion) | — | — | — |
| Test results | | | |
| Friction coefficient | 0.27 | 0.71 | 0.65 |
| Mass change percentage (%) | −0.50 | −0.02 | −0.04 |
| Type-A hardness | 85 | 85 | 86 |
| Breaking elongation $E_b$ (%) | 750 | 590 | 620 |

Figure 2:
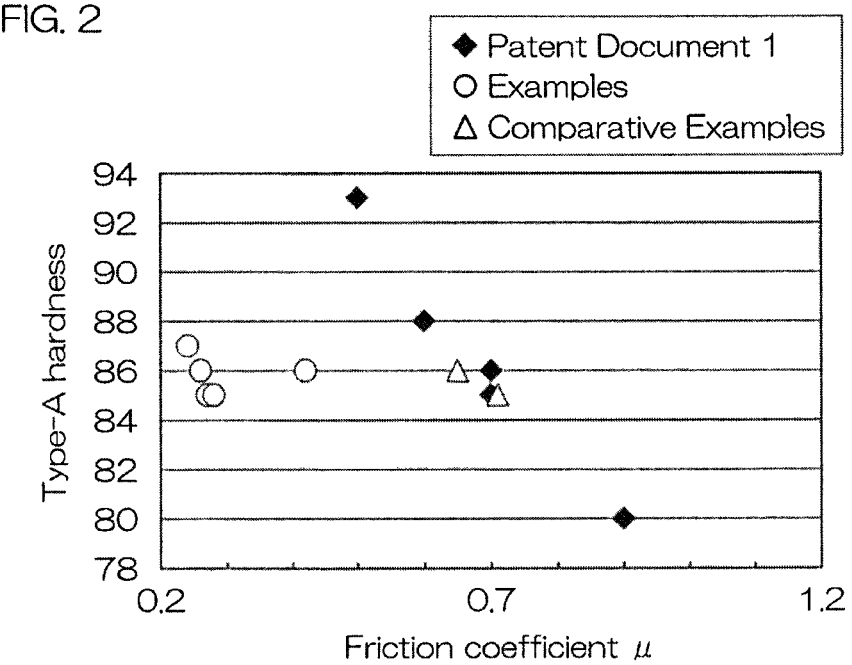
FIG. 2 is a graph showing relationships between the friction coefficient and the type-A durometer hardness for Examples and Comparative Examples in this disclosure, and Examples and Comparative Examples in Patent Document 1.

Relationships between the friction coefficient and the type-A durometer hardness for Examples (indicated by "○") and Comparative Examples (indicated by "Δ") in Tables 1 and 2 as well as for Examples and Comparative Examples (indicated by "♦") in Patent Document 1 are shown in FIG. 2.

The results shown in FIG. 2 and Tables 1 and 2 indicate that, where the sheet feed roller is produced by blending the low friction silicone compound with the elastomer composition containing the thermoplastic elastomer and the glass beads (spherical filler) and extruding the resulting elastomer composition, it is possible to control the friction coefficient of the sheet feed roller at not greater than 0.5, while imparting the sheet feed roller with a proper flexibility with the proportion of the spherical filler set equivalent to or smaller than in the conventional elastomer composition.

Particularly, the results for Examples 2 and 5 indicate that the thermoplastic urethane elastomer is preferably used for improvement of the wear resistance of the sheet feed roller, and that the thermoplastic polyester elastomer is preferably used for improvement of the flexibility of the sheet feed roller.

This application corresponds to Japanese Patent Application No. 2015-247780 filed in the Japan Patent Office on Dec. 18, 2015, the disclosure of which is incorporated herein by reference in its entirety.

What is claimed is:

1. A sheet feed roller comprising an elastomer composition comprising a thermoplastic elastomer, a spherical filler and a low friction silicone compound, the sheet feed roller having a friction coefficient of not greater than 0.5,
   wherein
   the thermoplastic elastomer is at least one selected from the group consisting of a thermoplastic urethane elastomer and a thermoplastic polyester elastomer,
   the spherical filler is at least one selected from the group consisting of glass beads, resin beads, spherical silica and spherical alumina, and
   the low friction silicone compound is at least one selected from the group consisting of a silicone/acryl composite resin material, an ultra-high molecular weight silicone polymer and silicone resin powder.

2. The sheet feed roller according to claim 1, wherein the spherical filler is at least one selected from the group consisting of glass beads, resin beads, spherical silica and spherical alumina.

3. The sheet feed roller according to claim 1, which has a type-A durometer hardness of not greater than 95.

4. A sheet feed roller comprising an elastomer composition comprising a thermoplastic elastomer, a spherical filler and a low friction silicone compound, the sheet feed roller having a friction coefficient of not greater than 0.5,
   wherein the low friction silicone compound is at least one selected from the group consisting of a silicone/acryl composite resin material, an ultra-high molecular weight silicone polymer and silicone resin powder.

5. The sheet feed roller according to claim 4, which has a type-A durometer hardness of not greater than 95.

6. A method of producing a sheet feed roller, comprising the steps of:
   preparing an elastomer composition comprising a thermoplastic elastomer, a spherical filler and a low friction silicone compound, the sheet feed roller having a friction coefficient of not greater than 0.5; and
   extruding the elastomer composition through a die configured as corresponding to a sectional shape of the sheet feed roller
   wherein
   the thermoplastic elastomer is at least one selected from the group consisting of a thermoplastic urethane elastomer and a thermoplastic polyester elastomer,
   the spherical filler is at least one selected from the group consisting of glass beads, resin beads, spherical silica and spherical alumina, and
   the low friction silicone compound is at least one selected from the group consisting of a silicone/acryl composite resin material, an ultra-high molecular weight silicone polymer and silicone resin powder.

* * * * *